United States Patent [19]
Betts-Williams et al.

[11] Patent Number: 6,065,686
[45] Date of Patent: May 23, 2000

[54] METHOD AND APPARATUS FOR THE DISTRIBUTION OF A LIQUID COMPOSITION

[75] Inventors: Stuart Alan Betts-Williams, Winterbourne Down; David Charles Gill, Bristol, both of United Kingdom

[73] Assignee: Nomix-Chipman Limited, Bristol, United Kingdom

[21] Appl. No.: 09/230,416

[22] PCT Filed: Jul. 24, 1997

[86] PCT No.: PCT/GB97/01978

§ 371 Date: Mar. 5, 1999

§ 102(e) Date: Mar. 5, 1999

[87] PCT Pub. No.: WO98/03733

PCT Pub. Date: Jan. 29, 1998

[30] Foreign Application Priority Data

Jul. 24, 1996 [GB] United Kingdom .................. 9615555

[51] Int. Cl.[7] .............................. B05B 17/00; E01H 11/00
[52] U.S. Cl. ................................ 239/10; 239/62; 239/69; 239/75; 239/155; 239/172; 239/173; 239/304; 239/670; 239/684; 222/617
[58] Field of Search .................... 239/10, 61, 62, 239/67, 68, 71, 75, 155, 172, 173, 174, 303, 304, 332, 398, 428, 310, 662, 665, 666, 670, 684, 677, 69; 222/613, 614, 617, 623–626

[56] References Cited

U.S. PATENT DOCUMENTS

| | | | |
|---|---|---|---|
| 4,052,003 | 10/1977 | Steffen | 239/155 X |
| 4,185,782 | 1/1980 | Belrose . | |
| 4,220,998 | 9/1980 | Kays . | |
| 4,274,585 | 6/1981 | Lestradet . | |
| 4,350,293 | 9/1982 | Lestradet | 239/155 |
| 4,358,054 | 11/1982 | Ehrat . | |
| 4,373,668 | 2/1983 | Forbes et al. | 239/670 X |
| 4,519,542 | 5/1985 | Johnston | 239/155 X |
| 4,805,088 | 2/1989 | Cross et al. | 239/155 X |
| 4,925,096 | 5/1990 | Gill | 239/10 |
| 5,310,113 | 5/1994 | Cowgur | 239/69 X |
| 5,904,296 | 5/1999 | Doherty et al. | 239/69 X |

FOREIGN PATENT DOCUMENTS 2 129 663  5/1984  United Kingdom .
WO 90 11010  10/1990  WIPO .

OTHER PUBLICATIONS

"Weedkiller train has advanced controls"; Railway Gazette International, vol. 139, No. 9, Sep. 1983, London GB, p. 173 XP002047819.

"Modern methods of weed control"; Railway Gazette International, vol. 126, No. 6, Mar. 20, 1970, London GB, pp. 229–231, XP002047820.

Primary Examiner—Andres Kashnikow
Assistant Examiner—Steven J. Ganey
Attorney, Agent, or Firm—Merchant & Gould, PC

[57] ABSTRACT

There is disclosed a method of distributing a liquid composition over the ground from travelling equipment, the composition comprising an active ingredient, in which method the concentration of the active ingredient in the liquid composition is varied in dependence on the speed of the travelling equipment over the ground, the liquid composition also comprising a viscosity modifying agent, the method comprising varying the relative proportion of the viscosity modifying agent in the liquid composition in dependence on the speed of the travelling equipment, thereby to control the viscosity of the liquid composition. Also disclosed is equipment for use in the aforesaid method.

**20 Claims,

METHOD AND APPARATUS FOR THE
DISTRIBUTION OF A LIQUID
COMPOSITION

This invention relates to the distribution of a liquid composition over the ground and is particularly although not exclusively concerned with such distribution from travelling equipment, for example the distribution of a herbicide composition from a vehicle.

In order to keep the area around railway lines free from vegetation, the area is treated by spraying herbicide from a specially adapted train. The train is equipped with one or more spraying heads, which discharge a dilute herbicide composition over the area to be treated. The ratio of diluent (typically water) to the active herbicide may be of the order of 40:1. The train typically operates at speeds of less than 72 km/h, and the spraying operation tends to drench the area to be treated, to ensure that all vegetation to be killed receives a lethal quantity of the active herbicide.

Examples of specially adapted trains for applying herbicides along railway lines are disclosed in Railway Gazette International, vol.139, no. 9, September 1983, page 713, and vol. 126, no. 6, March 1970, pages 229–231. These vehicles are equipped with nozzles to which spray solution (concentrate mixed with water) is supplied. The quantity of concentrate in the solution is varied in dependence on the travel speed of the vehicle.

U.S. Pat. No. 4,358,054 discloses a tanker truck for agricultural use. The truck has a main tank for containing water, for example, and smaller auxiliary tanks for containing different kinds of agrochemicals. Desired agrochemicals from the smaller tanks are mixed with the water before being supplied to spray nozzles. The supply of liquids from the tanks is varied in dependence of the travel speed of the truck.

The need to dilute the active herbicide for operation on railway lines means that the trains have to carry a large quantity of water, and consequently the train needs to include at least one tank wagon with a capacity of 27,000 liters, and possibly up to six tank wagons. As well as the cost of the water itself, the need to transport it over the railway involves increased track access charges and power requirements.

It is known to treat small areas, such as light rail systems and railway depots, by using a road vehicle which is adapted to travel on rails, and which is provided with relatively small capacity tanks for water and herbicide. Such a vehicle applies the herbicide through hydraulic nozzles which deliver high volume sprays at low pressure. This also requires a large volume of water to be carried. Attempts have been made to apply the herbicide to the track itself by a centrally mounted CDA unit, while the area immediately to the side of the track (the cess) and the area further to the side of the track (the scrub) are treated by means of hydraulic nozzles. However, such a vehicle cannot operate effectively at speeds greater than 16 km/h, which makes it impractical for main line track treatment. Also, it has proved impossible to use a conventional CDA unit for spraying to the side of the track, even at 16 km/h, because the turbulence generated by the vehicle entrains the droplets issuing from the CDA unit, with the result that the herbicide fails to reach the ground to be treated in a controlled manner. Consequently, not only is vegetation adjacent the track left untreated, but there is also the possibility of wind drift with the result that herbicide reaches neighbouring land, which is not meant to be treated. This is unacceptable.

In a conventional high volume spraying system, the viscosity of the sprayed formulation is substantially constant at approximately the viscosity of the diluent, namely water. In practice, a constant flow rate of water is maintained to the spray nozzles, and, as the speed of the train varies, so the flow rate of herbicide, to be mixed with the water, is varied. However, because the proportion of active ingredient in the formulation applied to the ground is so small, variations in the quantity of herbicide within the formulation has very little effect on the physical properties of the formulation. However, if a conventional CDA system is used, in which a herbicide formulation is applied without dilution (or at low dilution), any variation in the flow rate of herbicide with the speed of the vehicle has a major effect on the total flow of the CDA unit, and this will affect the droplet pattern with the result that effective treatment of the vegetation will not be maintained for all vehicle speeds.

In the light of the above factors, it has so far not been possible to apply herbicide from a moving vehicle by a CDA system, except at travelling speeds at which slipstream effects are negligible (at speeds not greater than 16 km/h).

According to the present invention, there is provided a method of distributing a liquid composition over the ground from travelling equipment, the composition comprising an active ingredient, in which method the concentration of the active ingredient in the liquid composition is varied in dependence on the speed of the travelling equipment over the ground, the liquid composition also comprising a viscosity modifying agent, the method comprising varying the relative proportion of the viscosity modifying agent in the liquid composition in dependence on the speed of the travelling equipment, thereby to control the viscosity of the liquid composition.

By using a method in accordance with the present invention, a liquid composition such as a herbicide may be distributed over the ground in a CDA system while maintaining a droplet pattern at a range of travelling speeds which ensures that the herbicide will fall to the ground over a defined area, without being seriously adversely affected by the slipstream of the vehicle.

In a CDA system, the liquid composition is distributed from a rotating distribution element which may rotate, for example, at a speed in the range of 800 to 4,000 rpm. This speed may be varied in accordance with the speed of the travelling equipment.

The liquid composition may also include a diluent such as water, the relative proportion of which in the composition may be varied.

The viscosity of the liquid composition may be controlled in such a way as to increase with increasing speed of the travelling equipment. -An objective is to ensure that the droplets issuing from the rotating distribution element are of such a size that they are substantially unaffected by the slipstream of the vehicle or, if they are broken up, result in smaller droplets which are still sufficiently large to maintain a desired trajectory and to fall to the ground without major interference from the air turbulence created by the travelling equipment. Thus, it is desirable for the size of the droplets issuing from the rotating distribution element to increase with increasing speed of the travelling equipment. By way of example, the liquid issuing from the rotating distribution element may form droplets having a diameter larger than 1 mm and possibly as large as 4 mm, when the vehicle is moving.

In some circumstances, it may be desirable to maintain the viscosity of the liquid composition substantially constant for all speeds of the travelling equipment. For example, the viscosity may be maintained in the range 2 to 1000 mPa.s (measured at a shear rate of 92 $s^{-1}$ at 20° C.).

For practical purposes, it is likely that the upper viscosity limit will be 200 mPa.s, or perhaps 100 mPa.s under the same conditions.

In preferred embodiments in accordance with the present invention, the viscosity measured under the same conditions is maintained within the range 20 to 90 mPa.s.

The quantities of the various components of the composition may be controlled so that, regardless of the speed of the travelling equipment, the volume flow rate of the liquid composition is maintained substantially constant. Thus, although the quantity of the active ingredient applied to the ground will vary with the speed of the travelling equipment, the total flow rate will remain the same, and this will assist in maintaining a desired droplet pattern. Alternatively, however, the volume flow rate of the liquid composition may vary with speed. For example it may be controlled so that it increases with increasing speed of the travelling equipment, in order to achieve a larger droplet size at higher speeds even if the droplet density (i.e. the number of droplets per unit area) remains the same. This increases the likelihood that all plants in the area to be treated will receive at least one droplet of the composition, and so will be killed.

By using a method in accordance with the present invention, the quantity of diluent (e.g. water) which needs to be carried by the travelling equipment can be substantially reduced. Consequently, a significantly smaller rail vehicle can be employed, which results not only in a reduction in capital costs, but also a reduction in operating costs, including track access charges.

According to another aspect of the present invention, there is provided equipment for mounting on a vehicle for distributing a liquid composition from the vehicle when travelling, the equipment comprising respective containers for an active ingredient, a viscosity modifying agent and a diluent, mixing means for receiving the materials from the containers and mixing them to form the liquid composition, metering means for regulating the flow rates of the materials from the containers to the mixing means, control means for controlling the metering means and delivery means for receiving the liquid composition from the mixing means and distributing it over the ground, the control means, in operation, varying the concentration of the active ingredient in the liquid composition in dependence on the speed of the travelling equipment and varying the relative proportions of the viscosity modifying agent and the diluent in the liquid composition in dependence on the speed of the travelling equipment, thereby to control the viscosity of the composition.

The equipment may be in a modular form, the containers, the mixing means and the control means being mounted on a common support for mounting and dismounting from a vehicle as a unit. The delivery means may be adapted for mounting on the vehicle separately from the other components of the equipment.

Such a modular construction avoids the need for the vehicle to be specially adapted before it can be used for distributing the liquid composition. For example, for rail use, a single rail vehicle may be sufficient, or a road vehicle in the form of a truck which has been modified for use on rails could be used.

A third aspect of the present invention provides a liquid composition (for example a plant treatment composition such as a herbicide) comprising:

(i) an active ingredient; and (ii) a viscosity modifying agent, the viscosity of the composition being higher than 33 mPa.s at a shear rate of 92 $s^-$ at 20° C.

Preferably, the viscosity is not less than 40 mpa.s, and most preferably not less than 50 mPa.s under the same conditions. Thus, the viscosity of the composition is greater than (and preferably significantly greater than) the viscosities of formulations conventionally used in CDA systems.

The composition may also comprise a pigment or other additive, which may have a density greater than the density of the active ingredient and/or of the viscosity modifying agent.

Such a composition may be used in carrying out the method or in use of the equipment as defined above, in which case the active ingredient and the viscosity modifying agent will be contained in separate containers and mixed to form the composition as the components of the composition flow to the delivery head.

The composition may also be delivered by a pedestrian operator, in which case the separate containers are carried by the operator (for example in a backpack) or are mounted on wheeled equipment propelled by the operator. The relative proportions of the components may then be adjusted to provide a desired droplet characteristic (for example, size), to achieve a desired distance over which the droplets will be thrown from the delivery head.

The liquid composition of the third aspect of the invention may be prepared by mixing together the following liquid ingredients prior to the delivery head, namely:

(a) a liquid composition containing the active agent;

(b) a liquid viscosity modifying formulation; and (c) optionally, a diluent.

Ingredient (a) is typically a concentrated solution or suspension of the active agent, such as a herbicide. Some commercial herbicidal formulations which are usable in the present invention have viscosities up to about 5000 mPa.s at a shear rate of $92s^{-1}$ at 20° C. More typically, the herbicidal formulations used in the present invention will have a viscosity up to about 1000 mPa.s at a shear rate of $92s^{-1}$ at 20° C.

The chemical nature of the viscosity modifying formulation is not critical, other than in its compatibility with the other ingredients of the final composition. One preferred group of viscosity modifying formulations are aqueous solutions of nonionic cellulosic substances, such as modified hydroxyethylcellulose, for example the formulation available under the name NATROSOL from Hercules Inc. Another group of viscosity modifying formulations are oil/water emulsions which may contain, for example:

10–75% by weight mineral or vegetable oil;

0.5–15% by weight surfactant emulsifier 0.5 to 10% by weight pigment or dye balance: water and which may have a surface tension in the range 20 to 50 $Mnm^{-1}$, preferably in the range 25 to 35 $mNm^{-1}$.

The viscosity modifying formulation preferably has a viscosity of at least 100 mPa.s at a shear rate of $92s^{-1}$ at 20° C., and preferably no greater than 2000 mPa.s, although in some circumstances, it may have a viscosity up to 5000 mPa.s at a shear rate of $92s^{-1}$ at 20° C. When the viscosity of the liquid composition containing the active agent is lower than the desired viscosity of the final formulation, the viscosity modifying agent will have a viscosity which is greater than the viscosity of the liquid composition containing the active agent. This will enable the viscosity of the final formulation to be adjusted during operation. In some circumstances, the viscosity of the liquid composition containing the active agent is higher than the desired viscosity of the final formulation in which case the viscosity modifying agent would normally have a viscosity which is less than the viscosity of the liquid composition containing the active agent, although, in some circumstances, it may be desirable to use a viscosity modifying agent which has a viscosity which is more than the viscosity of the liquid composition containing the active agent.

The optional diluent has a viscosity less than the viscosity of the liquid composition containing the active agent, i.e. less than about 10 mPa.s at a shear rate of $92s^{-1}$ at 20° C. The preferred diluent is water, which has a viscosity of about 1 mpa.s. The diluent may be necessary to permit adjustment of the viscosity of the final formulation.

In use, the amount of ingredient (a) fed to the delivery head will depend on the velocity of the travelling equipment. The proportions of the other two ingredients fed to the delivery head (the viscosity modifying formulation and the optional diluent) are varied to give a final composition having the desired viscosity.

This invention also relates to the aforesaid viscosity modifying formulation for use as an additive to a herbicidal formulation, and preferably for use as an additive for a herbicidal formulation which is to be used in the method of the first aspect of the present invention for distributing a liquid composition over the ground from travelling equipment.

For a better understanding of the present invention, and to show more clearly how it may be carried into effect, reference will now be made, by way of example, to the accompanying drawings, in which.

Figure 1:
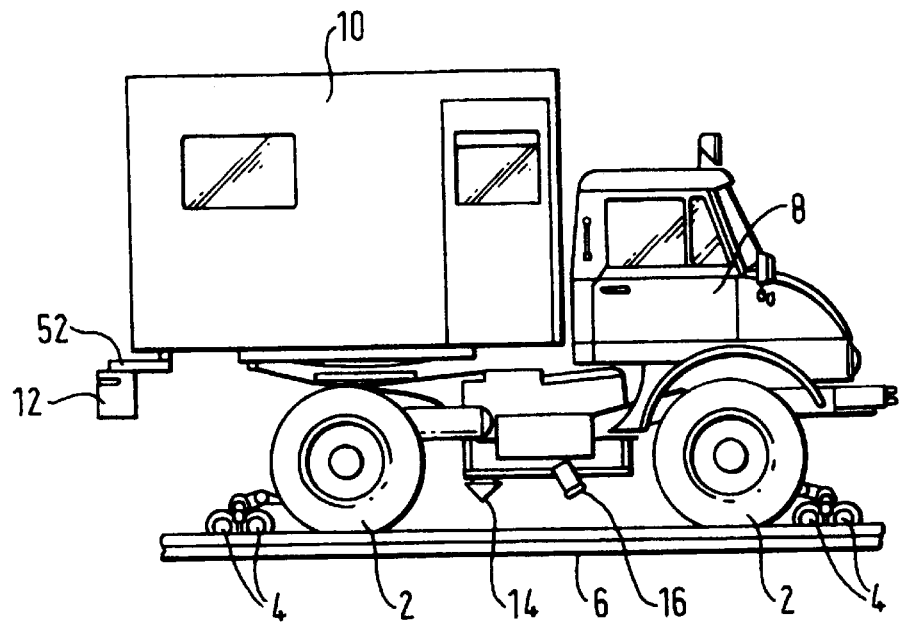
FIG. 1 is a side view of vehicle for applying herbicide in the region of a railway line.
Figure 2:
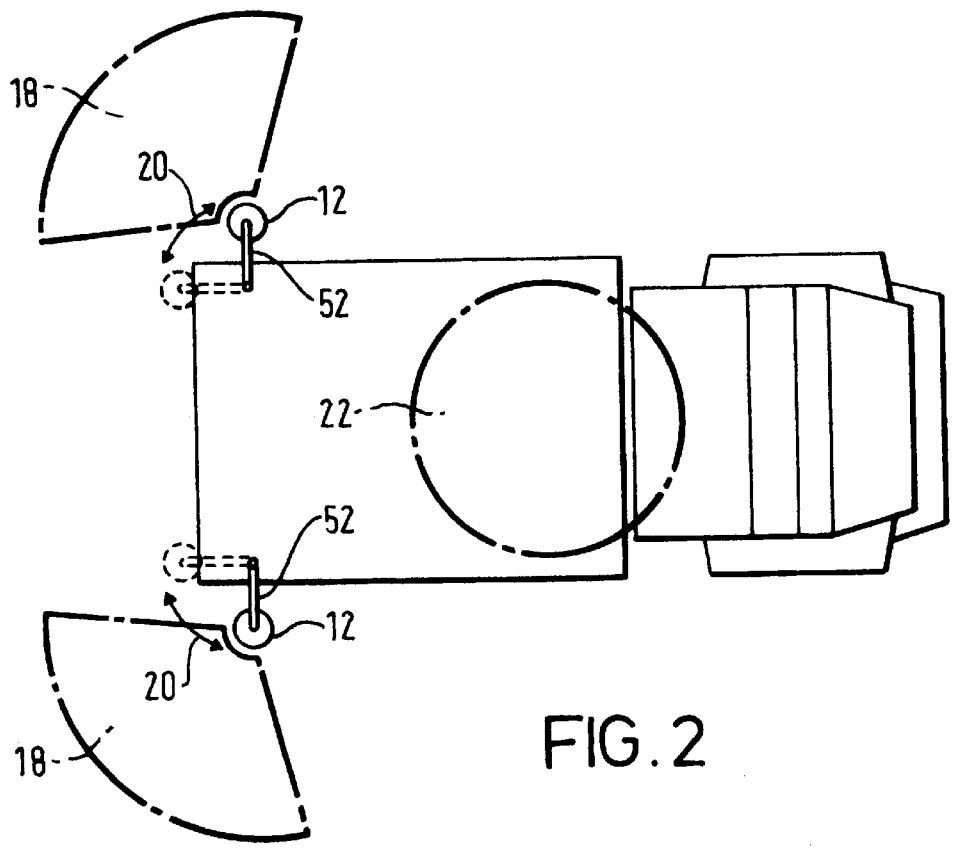
FIG. 2 is a plan view of the vehicle shown in FIG. 1.

The vehicle shown in FIGS. 1 and 2 is in the form of a light truck having road wheels 2. The truck is also provided with guide wheels 4 for cooperation with rails 6. Thus, the truck can travel along the rails 6, with the wheels 2 providing traction and the guide wheels 4 guiding the vehicle on the rails.

The truck has a driver's cab 8 and a cabin 10. At each rear corner of the cabin 10 there is a herbicide delivery head 12, which will be described in greater detail with reference to FIG. 4. Mounted generally centrally underneath the vehicle is a delivery head 14. The vehicle is also provided with a radar speed sensor The delivery heads 12 and 14 are part of a herbicide delivery system, most of which is accommodated in the cabin 10. In operation, the delivery heads 12 deliver herbicide in an arcuate spray pattern 18, the orientation of which can be adjusted as indicated by the arrows 20. The delivery head 14 distributes herbicide over a circular spray pattern 22. Thus, together, the delivery heads 12 and 14 can deliver herbicide over the full width of the track, the cess and the scrub.

Figure 3:
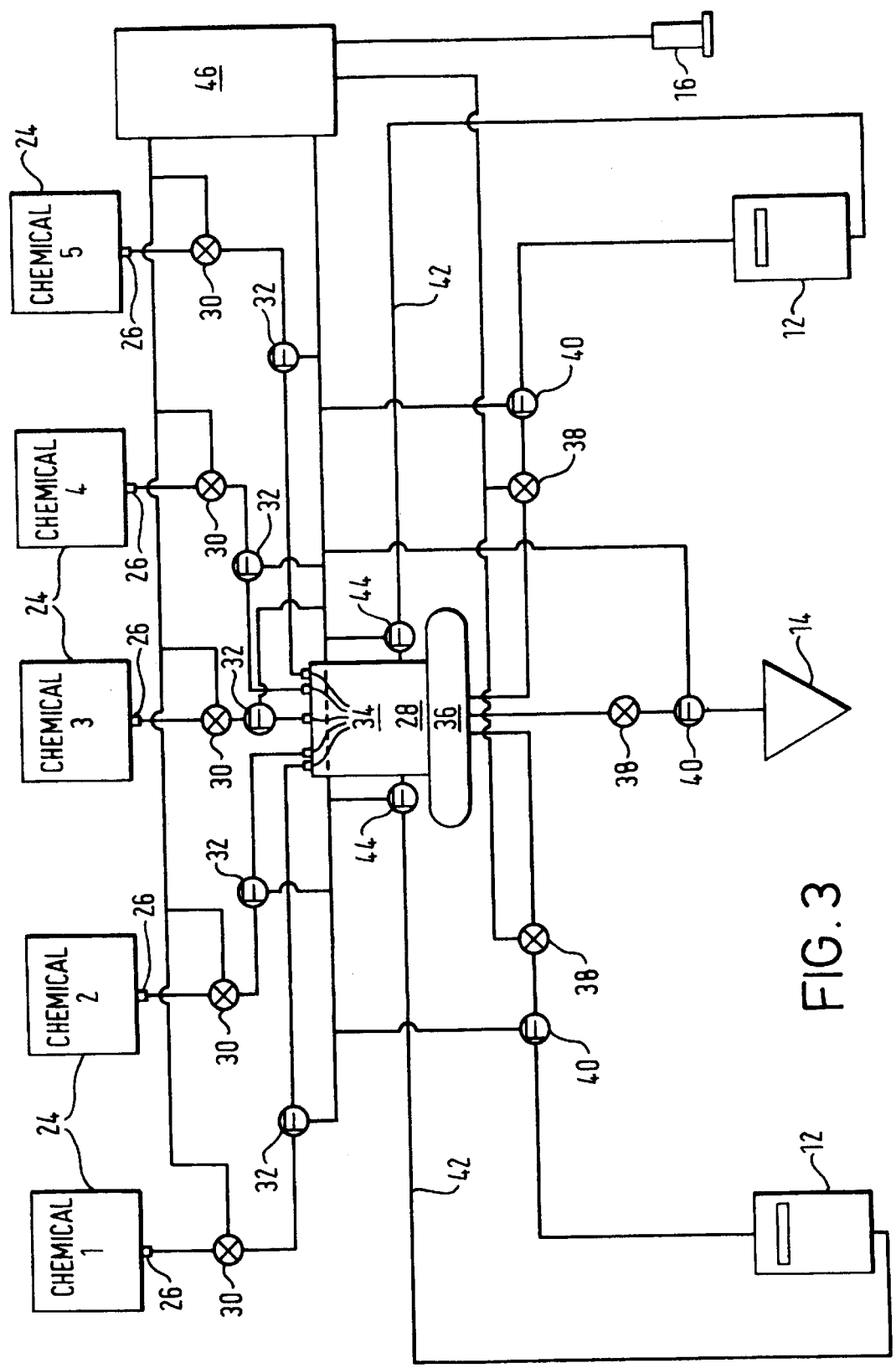
FIG. 3 is a diagrammatic view of the herbicide delivery system.

The herbicide delivery system as a whole is represented schematically in FIG. 3. The system includes separate containers 24 for different components of compositions to be delivered through the delivery heads 12 and 14. Each container has an outlet provided with a solenoid-controlled valve 26, and is connected by a respective fluid flow line to a mixing chamber 28. Each of these flow lines includes a pump 30 and a flow meter 32. Communication between the fluid flow lines and the interior of the mixing chamber 28 is controlled by microvalves 34.

The mixing chamber 28 communicates with a temperature controlled plenum 36. The plenum 36 is connected by respective fluid flow lines to the delivery heads 12 and 14, these fluid flow lines including pumps 38 and flow meters 40. Each delivery head 12 is connected to the mixing chamber 28 by a return line 42, which includes a flow meter 44.

The pumps 34 and 38, and the flow meters 32, 40 and 44 are connected by electrical leads to a processor 46. The processor 46 receives an input from the radar speed sensor 16 and, although not shown in FIG. 3, is connected to the solenoid valves 26 and the microvalves 34. An input device, such as a keyboard, and an output device, such as a VDU and/or a printer (none shown in FIG. 3) are also connected to the processor 46.

The containers 24, the processor 46 and its associated input and output devices, the mixing chamber 28 and the plenum 36, as well as most of the associated fluid flow lines and components are accommodated within the cabin 10. This equipment may be mounted on a common support for mounting on, and removal from, the vehicle as a single unit. This avoids the need for a time-consuming assembly or disassembly operation which would be required if each container and component is mounted separately in the vehicle.

For operation, the containers 24 contain different chemicals, as indicated by the references "Chemical 1", "Chemical 2" and so on in FIG. 3. By way of example, Chemical 1 could be a systemic herbicide, such as a herbicide containing glyphosate (for example the herbicide available under the name STIRRUP®), Chemical 2 could be a residual herbicide such as a herbicide containing glyphosate and diuron (for example the composition available under the name TOUCHÉ®), Chemical 3 could be a diluent such as water, Chemical 4 could be a viscosity modifying composition such as a modified hydroxyethylcellulose or other nonionic cellulosic (for example the formulation available under the name NATROSOL from Hercules Inc.), and Chemical 5 may be a cleaning composition.

For operation, the keyboard is used to input, into the processor 46, the parameters for a particular spraying operation. Such parameters may, for example, include such factors as the nature of the chemical to be delivered, the starting position and time of the spraying operation, the spraying pattern required (to be set by adjustment of the delivery head 12) and the required area density of the active herbicide time. When the vehicle begins to move along the track, the appropriate solenoid valves 26 and microvalves 34 the vehicle speed is detected by the speed sensor 16 and will be opened and the appropriate pumps 30 and 38 will be operated to supply the required components to the mixing chamber 28 in the required proportion and thence to supply the mixed composition to the delivery heads 12 and 14. For example, the composition may comprise a mixture of TOUCHÉ, the viscosity modifier and water. However, since an objective is to maintain a desired distribution density of the active ingredient (TOUCHÉ) over the ground, the flow rate of TOUCHÉ will need to be increased as the speed of travel of the vehicle increases, as measured by the radar speed sensor 16. This adjustment is effected by the processor 46 in accordance with look-up tables contained in its memory. If the total flow rate of the liquid composition to the delivery heads 12 and 14 is to be maintained constant, this means that the combined flow rate of the viscosity modifier and water will need to be decreased with increasing speed and, in the absence of corrective action, this could result in the viscosity of the formulation changing undesirably as the speed of travel changes (i.e normally the viscosity would decrease as the speed increases). To avoid this, the processor 46 controls the pumps 30 supplying the viscosity modifying agent and the water so that the flow rates of these two components is adjusted in order to create a mixed liquid composition reaching the delivery heads 12 and 14 which has the desired viscosity. Thus, to increase the viscosity of the mixture, the flow rate of the viscosity modifying agent would be increased and the flow rate of water would be decreased. The end result is that, regardless of speed, the total flow rate to the delivery head and the viscosity of the liquid is kept substantially constant.

In some circumstances, it may be appropriate for the processor 46 to be programmed in such a way that the viscosity of the composition remains constant over the full range of travel speeds of the vehicle. However, in some circumstances, it may be desirable for this viscosity to vary with the speed of travel. For example, it may be desirable for the viscosity to increase at higher speeds, in order to increase the droplet size of the liquid composition which is ejected from the delivery heads 12 and 14.

The temperature-controlled plenum 36 is provided to maintain the mixture at a controlled temperature so as to avoid temperature-dependent changes in viscosity.

By way of example, the following table represents the viscosities (at 20° C.) of different mixtures which may be delivered by the system represented in FIG. 3. The NATROSOL solution used comprises a 1.3% solution of NATROSOL in water.

| | Viscosity (mPa · s) | | |
|---|---|---|---|
| Shear rate ($S^{-1}$) | 84% TOUCHÉ/16% NATROSOL (1.3% solution in water) | 50% TOUCHÉ/50% Water | 100% TOUCHÉ |
| 92 | 81 | 2.4 | 33 |
| 146 | 79 | 2.2 | 31 |
| 231 | 78 | 2.1 | 30 |
| 367 | 76 | 2.1 | 30 |

It is envisaged that the 84% TOUCHÉ/16% NATROSOL mixture would be the most viscous mixture which would be used in practice, while the 50% TOUCHÉ/50% water mixture would be the least viscous usable mixture.

Relevant information relating to the operation of the vehicle can be displayed on the VDU and/or printed out by the printer. Such information may, for example, include:

1. Capacity remaining in each container 24
2. Range, at current settings
3. Application Rate
4. Application Band
5. Average Speed
6. Distance Covered
7. Nature of chemical mix factor FIG. 4 shows one of the delivery heads 12. The delivery head comprises a casing 48 which is pivotably supported on a splined spigot 50 which itself can pivot on a supporting arm 52 mounted on the vehicle. The casing 48 is divided into upper and lower compartments 54 and 56 by a partition 58. In the lower compartment 56 there is a distribution element 60 which is generally in the form of a conical cup having a serrated periphery. The cup 60 is supported both axially and rotationally on a shaft 62 which extends into the upper compartment 54. In the compartment 54, there is a motor 64 and an actuator 66. The shaft 62 is connected to the output of the motor 64 so as to be driven rotationally by the motor 64, while being axially displaceable relatively to it. The shaft 62 is connected to the actuator 66 for axial displacement relatively to the partition 58.

A support structure 68 projects into the lower compartment 56 from the partition 58. Pivotable links 70 extend between the support structure 68 and the conical portion of the cup 60, the cup 60 being rotatable relatively to the links 70.

The lower compartment 56 is divided into inner and outer chambers 72 and 74 by a partition 76. In the lower region of the inner chamber 72 there is a perforated screen 78. A spindle 80 is connected to the cup 60 for rotation with the cup, but is axially movable relatively to it. At the lower end of the spindle 60, there is an impeller 82 situated in an impeller chamber 84 provided in the outer chamber 74 of the lower compartment 56. The impeller chamber 84 is connected by a recirculation line 86 to a recirculation feed tube 88 which is supported by the support structure 68 and terminates within the cup 60. The support structure 68 also carries an inlet pipe 90, which is connected to an inlet tube 92, through which the herbicide composition to be delivered is supplied from the temperature controlled plenum 36. The inlet tube 92 is accommodated in a sleeve 94 which is secured to the casing 48, and which also accommodates electrical leads 96 for the various electric components accommodated within the casing 48.

A level tube 98 extends vertically within the outer chamber 74 and communicates with the inner chamber 72 at its top and bottom ends. A float 100, having a magnetically susceptible portion, is situated within the level tube 98 for movement through a magnetic sensor 102.

The casing 48 has a slot 104 situated at the level of the outer periphery of the cup 60. A corresponding slot 106 is provided in the partition 76. A shield 108 is movable upwardly and downwardly to open and close the slot 104, under the control of an actuator 110. A transverse actuator 112 is also provided for moving the shield 108 in the lengthwise direction of the slot 104, thereby to adjust the length of the slot.

A pinion 114 meshes with the splined portion of the spigot 50, and is mounted for rotation by a motor 116. An actuator 118 accommodated within the lower compartment 56 engages the outer extremity of the support arm 52 at a position away from the pivotal connection between the spigot 50 and the support arm 52.

In use, the delivery head 14 is supported on the vehicle by the support arm 52, as shown in FIGS. 1 and 2. The inlet tube 92, and the electric leads 96 extend into the cabin 10, where the inlet tube 92 is connected to the respective flow meter 40 and the leads 96 are connected to the processor 46. The orientation and tilt of the casing 48 are set by means of the motor 116 and the actuator 118 under the control of the operator. For example, various pre-programmed settings for the position of the casing 48 relatively to the vehicle may be contained in a memory of the processor 46. Alternatively, the portion of the delivery head may be set manually by the operator.

A camera or other imaging device, such as a CCD camera 120 is positioned adjacent the slot 104 to generate an image of the droplet pattern emerging from the slot 104. The processor 46, or separate image analysis means, is provided with a memory which contains data in digitized form representing a plurality of droplet patterns corresponding to respective different operating conditions, for example different viscosities and flow rates of the liquid, and different rotary speeds and diameters of the cup 60. By appropriate feedback circuitry, it is thus possible to control the operating conditions to provide a droplet pattern of the desired characteristics.

For operation, the shield 108 is raised by the actuator 110 when power is applied to the actuator 110. Also, the actuator 112 is operated to free the desired length of the slot 104 as determined by the operator, or in accordance with a pre-programmed setting. The cup 60 is rotated by the motor 64 at a speed in the range 800 to 4000 rpm. Herbicide formulation from the mixing chamber 28 is supplied through the inlet tube 92 and the inlet pipe 90 to fall into the cup at a position near its rotational axis. As a result of centrifugal force, the liquid flows outwardly and upwardly over the surface of the cup to be discharged from the serrated periphery as a stream of droplets. Some of these droplets will be discharged through the slots 106 and 104 to be discharged from the vehicle over the spray pattern 18 represented in FIG. 2. Those droplets which do not pass through the slot 106 will land on the partition 76 to form a film of liquid which will flow down past the screen 78 into the impeller housing 84. This liquid will be driven by the impeller 82 up the recirculation tube 86 and then down the recirculation pipe 88 to return to the cup 60 to supplement the flow from the inlet pipe 90. Alternatively, as shown in FIG. 3, the liquid may be recirculated by the impeller 82 to the mixing chamber 28.

The level of recirculating liquid within the inner chamber 72 is monitored by means of the float 100 and the sensor 102. As the level rises, the float 100 also rises, and, as it moves past the sensor 102, a signal is sent to the processor 46 representing the level of liquid in the chamber 72. The pump 38 supplying the delivery head 14 in question is controlled on the basis of this signal to keep the level within desired limits. The delivery head will then continue to operate by delivering recirculated liquid supplied by the impeller 82 through the recirculation pipe 88 until the float 100 has fallen to a predetermined level, whereupon supply through the inlet pipe 90 will be restarted.

If abnormal circumstances arise, for example if people or animals are observed at the side of the track, the operator can activate an emergency shut-off procedure which includes de-energization of the actuator 110 so that the shield 108 falls across the slot 104. This closes the slot 104 so that no further herbicide can be ejected, even if the cup 60 continues to rotate.

When the shield 108 is lowered, any liquid passing through the slot 106 will be arrested by the shield 108 and will flow down the outer chamber 74 to a drain opening 120, through which it returns to the inner chamber 72.

The droplet pattern can be adjusted by altering the vertex angle of the cup 60, for example between 800 and 120°, representing a range for the outside diameter of the cup 60 of 140 to 175 mm. This is achieved by means of the actuator 66, which can be operated to raise and lower the shaft 62 to which the cup 60 is rigidly attached. If the shaft 62 is raised from the position shown in FIG. 4, the links 70 react against the outer region of the cup 60 to deform it into a flatter profile. To this end, the cup 60 is fluted and is made from a relatively elastic material, such as relatively inert plastics material (for example, poly vinyl chloride) which is not susceptible to attack from any of the components of the herbicide formulation.

The speed of rotation of the cup 60 as well as its vertex angle, may be varied in dependence on the travel speed of the vehicle, and on the length of the trajectory over which the droplets are intended to travel. The speed of rotation of the cup 60 will depend also on the viscosity of the herbicide composition, since these factors have an influence on the droplet pattern which is produced.

The delivery head may be provided with a sensor, such as a passive infra-red (PIR) sensor which responds to the proximity of people and/or animals. If activated, the sensor generates a signal which is transmitted to the process 46, causing the shield 108 to be moved across the slot 104 to prevent the discharge of the herbicide. The supply of herbicide to the cup 60 may also be terminated. This safety measure avoids accidental contact between people or livestock and the herbicide.

The vehicle may be equipped with a navigation system, for example a satellite navigation system utilizing global position satellites (GPS), in order to provide accurate positioning data for the equipment, for correlation with data relating to the nature of chemical and application rate, so that a full record of a spraying operation can be created.

Figure 4:
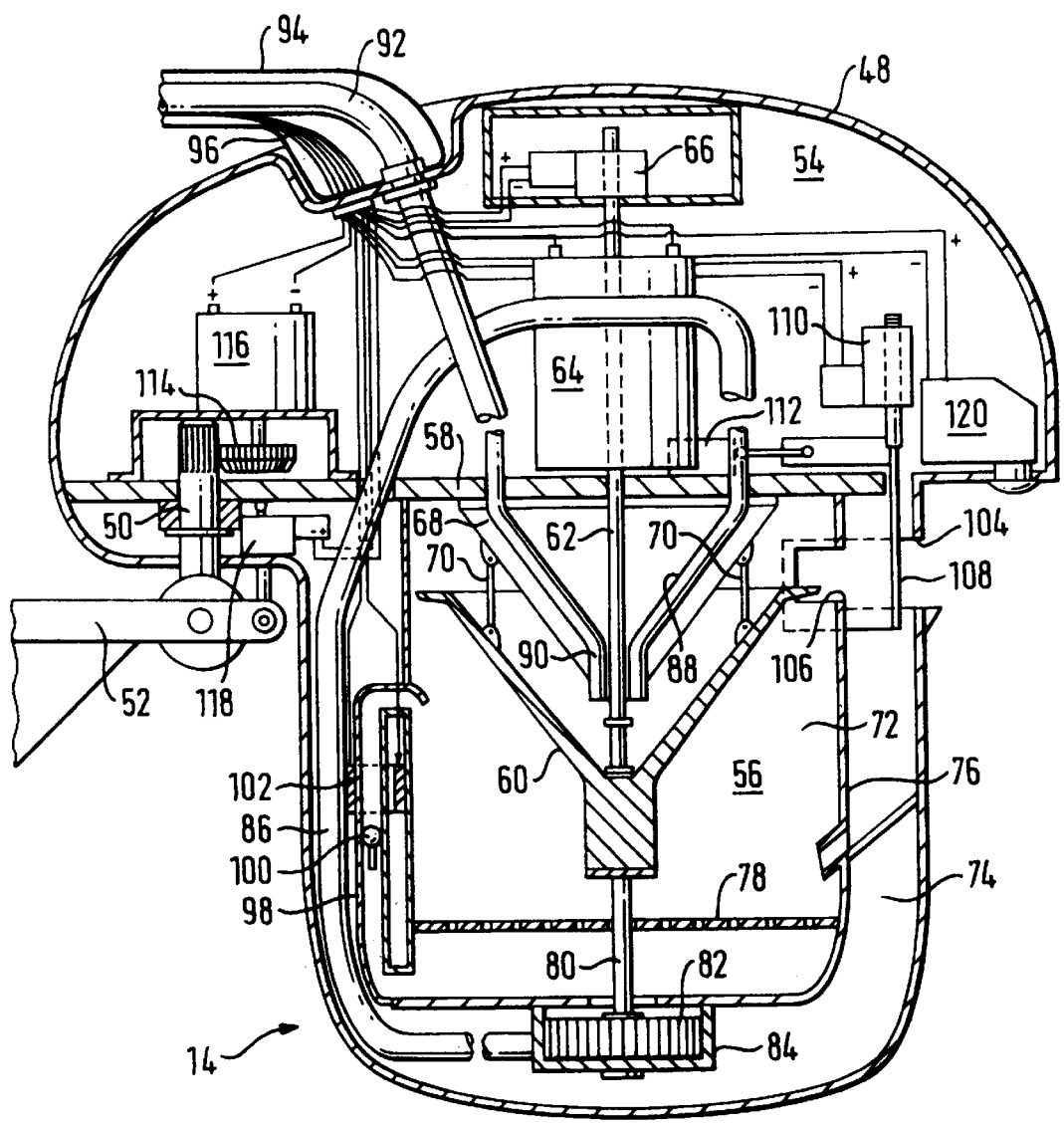
FIG. 4 is a sectional view of a delivery head of the system of FIG. 3.
Figure 5A:
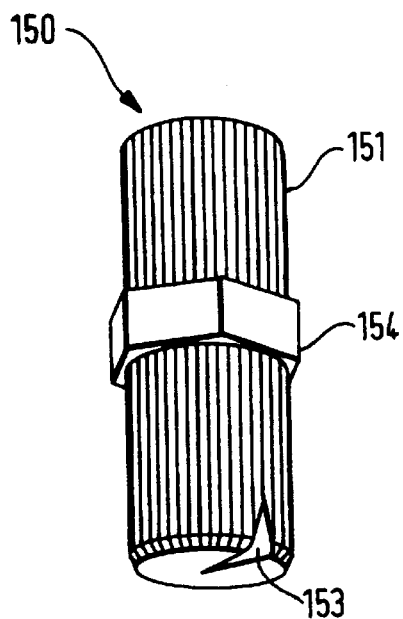
FIG. 5A is a perspective view of a conventional delivery head suitable for use with the system of FIGS. 1 to 3.
Figure 5B:
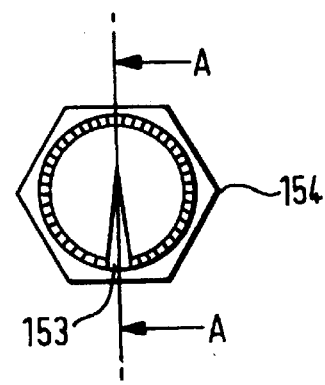
FIG. 5B is an underneath plan view of the head of FIG. 5A.
Figure 5C:
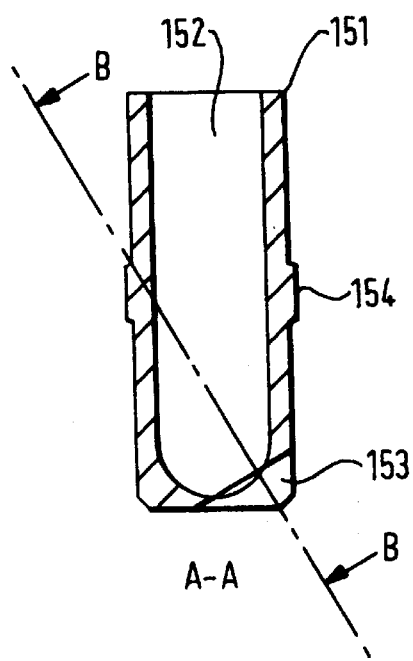
FIG. 5C is a sectional side view of the head of FIG. 5A, taken along line A—A in FIG. 5B.
Figure 5D:
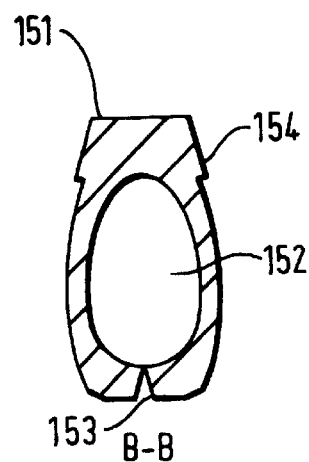
FIG. 5D is a sectional view taken on the line B—B in FIG. 5C.

Features of the delivery head shown in FIG. 4 are considered to be inventive, and this application is to be considered as an application for protection of those features.

A conventional delivery head which is suitable for use in the system of FIGS. 1 to 3, in place of the delivery head shown in FIG. 4, is shown in FIGS. 5A to 5D. The conventional delivery head 150 comprises a body member 151 which contains a cavity 152. Fluid to be delivered by the head 150 is forced into the cavity 152. A slot 153 in the body member 151 allows such fluid to escape from the cavity 152 in a controlled manner. The head 150 is provided with a locating ring 154 which enables the head to be fixed to the fluid delivery system in conventional manner.

What is claimed is:

1. A method of distributing a liquid composition over the ground from travelling equipment, the composition comprising an active ingredient, in which method the concentration of the active ingredient in the liquid composition is varied in dependence on the speed of the travelling equipment over the ground, the liquid composition also comprising a viscosity modifying agent, the method comprising varying the relative proportion of the viscosity modifying agent in the liquid composition in dependence on the speed of the travelling equipment, thereby to control the viscosity of the liquid composition.

2. A method as claimed in claim 1, in which the liquid composition also comprises a diluent, the method comprising varying the relative proportion of the diluent in the liquid composition in dependence on the speed of the travelling equipment.

3. A method as claimed in claim 1, in which the concentration of the active ingredient is increased with increasing speed of the travelling equipment.

4. A method as claimed in claim 1, in which the liquid composition is distributed from a rotating distribution element mounted on the travelling equipment.

5. A method as claimed in claim 4, in which the viscosity of the liquid composition is controlled in such a way as to increase with increasing speed of the travelling equipment.

6. A method as claimed in claim 4, in which the viscosity of the liquid composition is controlled in such a way as to cause the size of droplets ejected from the rotating distribution element to increase with increasing speed of the travelling equipment.

7. A method as claimed in claim 1, in which the viscosity of the liquid composition is maintained substantially constant for all speeds of the travelling equipment.

8. A method as claimed in claim 1, in which the viscosity of the liquid composition is maintained at a value not less than 2 mPa.s, and not greater than 1000 mPa.s, measured at a shear rate of $92s^{-1}$ at 20° C.

9. A method as claimed in claim 8, in which the viscosity of the liquid composition is maintained substantially at a value not less than 20 mpa.s and not greater than 90 mPa.s measured at a shear rate of $92s^{-1}$ at 20° C.

10. A method as claimed in claim 1, in which the volume flow rate of the liquid composition is maintained substantially constant for all speeds of the travelling equipment.

11. A method as claimed in claim 1, in which the volume flow rate of the liquid composition is increased with increasing speed of the travelling equipment.

12. A method as claimed in claim 1, in which the active ingredient, the viscosity modifying agent and the diluent are supplied from separate sources (24) mounted on the travelling equipment and are fed to a mixing region by respective metering devices.

13. A method as claimed in claim 12, in which the metering devices are under the control of a computer (46) which receives an input signal representing the speed of the travelling equipment.

14. Equipment for mounting on a vehicle for distributing a liquid composition from the vehicle when travelling, the equipment comprising respective containers (24) for an active ingredient, a viscosity modifying agent and a diluent, mixing means (28) for receiving the materials from the containers (24) and mixing them to form the liquid composition, metering means (32) for regulating the flow rates of the materials from the containers (24) to the mixing means (28), control means (46) for controlling the metering means (32) and delivery means (12,14) for receiving the liquid composition from the mixing means (28) and distributing it over the ground, the control means (46), in operation, varying the concentration of the active ingredient in the liquid composition in dependence on the speed of the travelling equipment and varying the relative proportions of the viscosity modifying agent and the diluent in the liquid composition in dependence on the speed of the travelling equipment, thereby to control the viscosity of the composition.

15. Equipment as claimed in claim 14, in which the metering means (32) comprises respective metering pumps for regulating the flow rates of the respective materials.

16. Equipment as claimed in claim 14, in which the control means (46) comprises a computer which is adapted to receive an input signal representing the speed of a vehicle on which the equipment is mounted.

17. Equipment as claimed in any claim 14, in which the containers (24), the mixing means (28) and the control means (46) are mounted on a common support for mounting on and dismounting from a vehicle as a unit.

18. Equipment as claimed in claim 17, in which the delivery means (12,14) is adapted for mounting on the vehicle separately from the other components of the equipment.

19. Equipment as claimed in claim 14, in which the delivery means (12,14) comprises at least one rotatable element (60) for receiving the liquid composition and ejecting it from its periphery under centrifugal force.

20. Equipment as claimed in claim 14, in which the delivery means (12,14) comprises a hydraulic nozzle (FIG. 5).

* * * * *